United States Patent [19]

Sugie et al.

[11] Patent Number: 4,579,574
[45] Date of Patent: Apr. 1, 1986

[54] MOLD LUBRICATING APPARATUS FOR GLASSWARE MAKING MACHINES

[75] Inventors: Akio Sugie; Atsuyuki Yamawaki, both of Takarazuka; Hiromitsu Doi; Katsuki Azuma, both of Nishinomiya, all of Japan

[73] Assignee: Yamamura Glass Kabushiki Kaisha, Nishinomiya, Japan

[21] Appl. No.: 683,231

[22] Filed: Dec. 18, 1984

[30] Foreign Application Priority Data

Dec. 27, 1983 [JP] Japan .................. 58-245886

[51] Int. Cl.[4] .................................. C03B 40/02
[52] U.S. Cl. ........................ 65/170; 65/25.1; 65/262
[58] Field of Search .............. 65/25, 169, 170, 262

[56] References Cited

U.S. PATENT DOCUMENTS

| | | | |
|---|---|---|---|
| 2,230,609 | 2/1941 | Cannon | 65/170 X |
| 3,141,752 | 7/1964 | Keller | 65/25 |
| 3,480,422 | 11/1969 | Lichok et al. | 65/170 X |
| 3,523,016 | 8/1970 | Mattos | 65/170 |
| 3,580,711 | 5/1971 | Hamilton | 65/169 |
| 3,623,856 | 11/1971 | Keller | 65/169 |
| 4,392,880 | 7/1983 | Dahms | 65/170 |
| 4,409,010 | 10/1983 | Brown | 65/170 X |

FOREIGN PATENT DOCUMENTS 2141455 3/1973 Fed. Rep. of Germany .

Primary Examiner—Robert Lindsay
Attorney, Agent, or Firm—Holman & Stern

[57] ABSTRACT

The disclosure is directed to a mold lubricating apparatus for glassware making machines, which is so arranged that nozzle holders 5 having nozzles 12 respectively directed toward mold surfaces of the neck rings from lower portions at opposite sides of the neck molds 13 and through-holes 5a, are connected to opposite ends of air feeding block and oil feeding block 7, 7a disposed on a horizontal bracket 3 provided at the upper portion of a plunger mechanism 1, while nozzle holders having nozzles 17 directed toward mold surfaces during opening of blank molds 18, and through-holes 6a are formed on an air feeding and oil feeding block 6A on the horizontal bracket 3.

4 Claims, 10 Drawing Figures

MOLD LUBRICATING APPARATUS FOR GLASSWARE MAKING MACHINES

BACKGROUND OF THE INVENTION

The present invention generally relates to a mold lubricating apparatus for glassware making machines, and more particularly, to an apparatus employed for applying a lubricant, for example, in the form of a liquid or solution (referred to merely as a lubricant solution hereinafter) onto molds of a glass bottle making machine, and so arranged that, by automatically applying the lubricant solution onto surfaces of bottle forming molds, a gob of molten glass is smoothly charged or loaded into the molds, and glass articles thus formed are separated from the molds in an efficient manner.

As prior art techniques for the devices of the above described type, there have conventionally been known arrangements as follows.

(a) An apparatus arranged to spray a lubricant into molds through a funnel (U.S. Pat. No. 3,141,752).

(b) An apparatus adapted to spray a lubricant solution into molds by a lubricant solution applying means provided at a position different from a supply path of molten glass (German Laid-Open Patent Publication No. P2141455 of Aug. 18, 1971 and U.S. Pat. No. 3,623,856).

However, since each of these apparatuses is arranged to spray the lubricant solution downwardly from above the molds, the plunger employed therein is subjected to the lubricant solution, with consequent undesirable rapid cooling, local cooling and soiling of the plunger, thus resulting partly in the formation of defects in the finished glass articles.

Moreover, since the apparatus of this kind is installed in an atmosphere at high temperatures, if the lubricant solution is arranged to be sprayed downwardly as described above, the lubricant solution to be sprayed is disturbed by the effect of a rising air current, thus resulting in such a disadvantage that uniform application of the lubricant onto the mold surfaces can not necessarily be readily effected.

SUMMARY OF THE INVENTION

Accordingly, it is a primary object of the present invention to provide an improved mold lubricating apparatus for glassware making machines, for example, glass bottle making machines, which is capable of uniformly applying a lubricant solution onto surfaces of molds, with simultaneous elimination of soiling of a plunger by the lubricant solution so as to solve the problems inherent in the conventional arrangements of this kind.

It is another important object of the present invention to provide a mold lubricating apparatus of the above described type which is simple in construction and stable in functioning.

According to the present invention, since the arrangement is so made that the lubricant solution is sprayed towards mold surfaces from under a predetermined stopping position of forming molds neck rings, blank molds, there is no possibility that the spray thereof is disturbed by a rising air current, thus making it possible to uniformly apply the lubricant solution, while the required amount of the lubricant solution may be suppressed to minimum, with a prolonged mold life.

Moreover, according to the present invention, owing to the fact that a nozzle holders are fixed to a plunger mechanism, even when the molds are replaced by molds of other kinds, the position and distance relation between the nozzles and the molds is maintained constant at all times with respect to the vertical movements of said mechanism, and thus, the amount of application of the lubricant solution onto the mold surfaces may be maintained constant.

Furthermore, since the nozzle holders are fixed to a bottom plate mechanism, even when a height of the bottom plate mechanism is altered due to a change of formed articles into other kind, the positional relation of the nozzles and the bottom plate is still maintained constant with respect to the vertical movements of the bottom plate mechanism, thus making it possible to retain the amount of the lubricant solution to be applied to the surfaces of the bottom plates at a constant level.

As a result of the above effects, it becomes possible to provide a mold lubricating apparatus in which the state of spraying of the lubricant solution does not vary, and the adjustment of the amount of application of the lubricant solution is simplified.

DESCRIPTION OF THE PREFERRED EMBODIMENTS

Subsequently, one preferred embodiment according to the present invention will be described hereinbelow with reference to the accompanying drawings.

Figure 1:
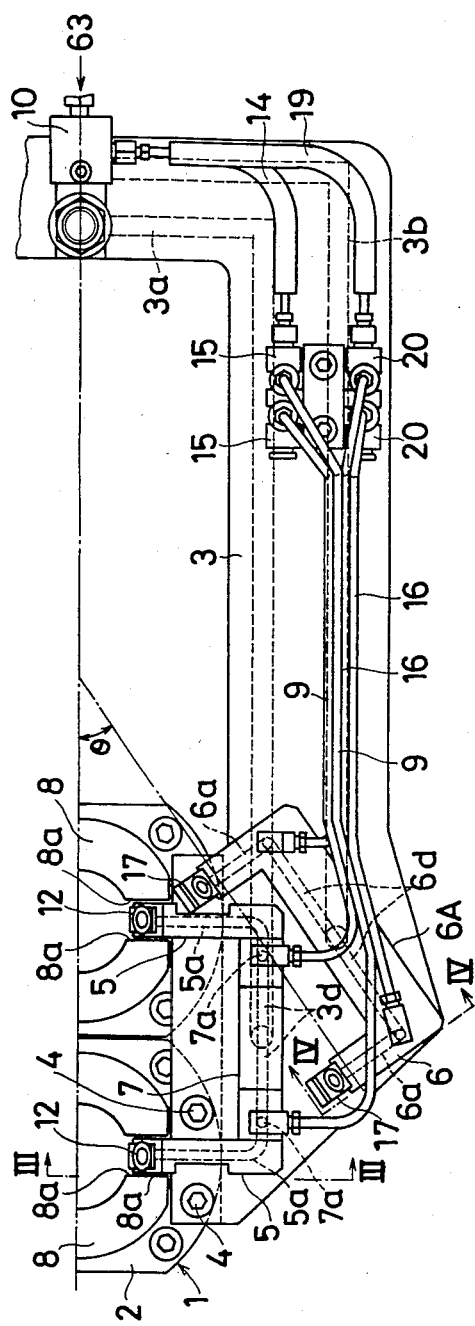
FIG. 1 is a fragmentary top plan view of a mold lubricating apparatus according to one preferred embodiment of the present invention.

This embodiment is related to a lubricating apparatus to be employed for the application of a lubricant solution onto blank molds and neck rings for glass bottles. In FIG. 1, there is provided a plunger mechanism 1 of a double-gob system, which is arranged to be capable of effecting two blowings simultaneously. With respect to a cap 2 located at the upper portion of this mechanism 1, a support bracket 3 is fixed by bolts 4. On the above bracket 3, two neck mold nozzle holders 5 and blank mold nozzle holders 6 are mounted.

Firstly, the neck ring apparatus will be explained hereinbelow.

The neck ring nozzle holders 5 are pivotally connected for rising and lowering to opposite ends of an oil feeding block 7 provided on the bracket 3, and confront inside grooves 8a provided at the left and right sides of neck ring receiving seats 8 for the respective plunger portions.

There are provided neck ring oil feeding pipes 9 which are respectively connected to lubricant solution introducing passages 7a formed in the oil feeding block 7 so as to correspond to the respective neck ring nozzle holders 5.

In the support bracket 3 described above, an air feeding passage 3a is provided so as to be connected, through distribution passages 3d, with the introducing passages 7a in the oil feeding block 7 respectively, whereby the lubricant solution fed through the oil feeding pipe 9 and air supplied through the air feeding passage 3a join each other at said introducing passages 7a.

In the respective nozzle holders 5, there are formed through-holes 5a, while neck ring nozzles 12 communicated with said through-holes 5a are mounted to forward end portions of the respective nozzle holders 5. The nozzles 12 are located in the concave groove 8a of the corresponding neck ring receiving seats 8 when the nozzle holders 5 are in the lowered attitude as shown in solid lines in FIG. 3. Simultaneously, the nozzles 12 are set upwardly so as to be directed towards the mold surfaces of the neck rings 13 which revert onto said neck ring receiving seats 8. The through-holes 5a of the nozzle holders 5 are so arranged that parts thereof are aligned with the introducing passages 7a of the air feeding block 7 in the lowered attitude referred to above.

On the support bracket 3, there is mounted a junction block 10, and the lubricant supplied via an oil feeding passage 61 from an oil feeding system to be described later is distributed into the respective oil feeding pipes 9 through this block 10, an oil feeding pipe 14, and constant amount feeding devices 15 by which the oil feeding amount to the respective nozzles 12 is to be controlled as desired.

Figure 3:
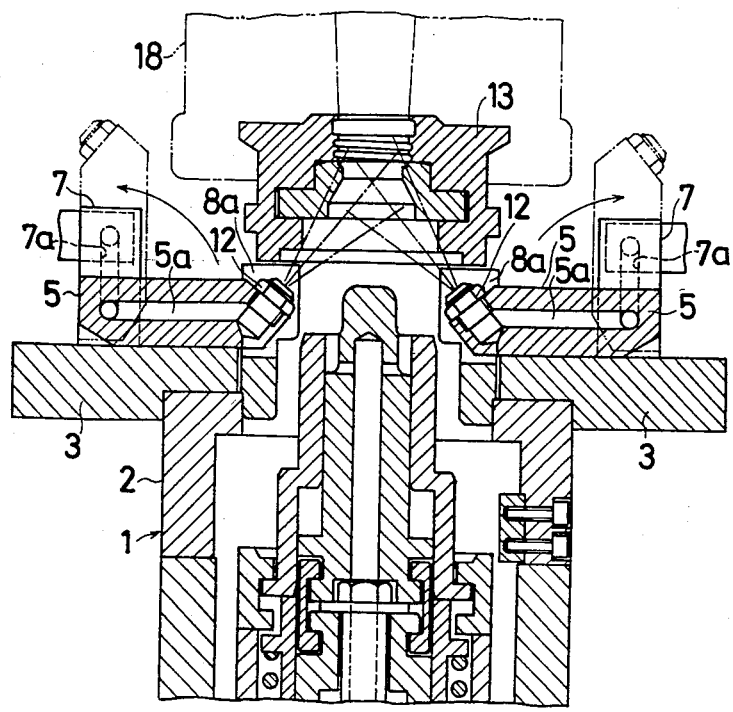
FIG. 3 is a cross section on an enlarged scale taken along the line III—III in FIG. 1.
Figure 4:
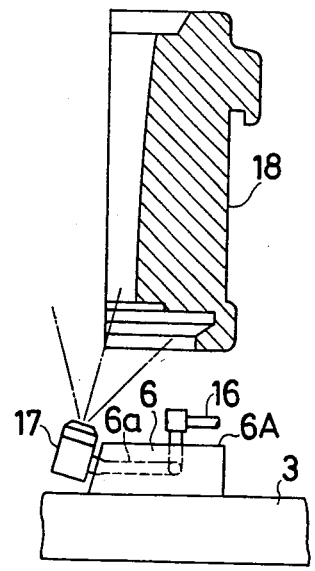
FIG. 4 is a fragmentary vertical sectional view taken along the line IV—IV in FIG. 1.

The mechanisms as described so far are also provided at the opposite side, with the plunger mechanism 1 held therebetween, and at each of the neck ring receiving seats 8, one pair of the nozzles 12 are positioned to confront each other as illustrated in FIG. 3.

Subsequently, the apparatus with respect to the blank molds will be described.

The blank mold nozzle holders 6 have nozzles 17 at both ends thereof, and these nozzles 17 are arranged to be located under a position where (half parts of blank mold) 18 (shown by imaginary lines in FIG. 3) are fully opened (at an angle indicated by $\theta$ in FIG. 1, which is 35° in the embodiment), with the applying direction thereof being set upwardly to be directed towards the mold surfaces of the two (half parts of blank mold) 18.

Blank mold oil feeding pipes 16 are respectively connected with through-holes 6a formed in both ends of the blank mold nozzle holders 6. With respect to these through-holes 6a, an air feeding passage 3b in the support bracket 3 is connected. The air feeding passage 3b is connected from an air feeding block 6A on the bracket 3 to two distributing passages 6d in said holders 6, while the distributing passages 6d are communicated with the through-holes 6a.

In the similar manner as in the neck rings, the lubricant solution supplied from the oil feeding system to be described later through an oil feeding passage 63, is distributed into the respective oil feeding pipes 16 through the junction block 10, oil feeding pipe 19, constant amount feeding devices 20. By the above constant amount feeding devices 20, the oil feeding amount to the respective nozzles 17 is adjusted as desired.

Also with respect to the mechanisms for the blank molds as described so far, the similar mechanism corresponding to the other two-split mold section (to be opened at an upper half side in FIG. 1) which is in pair with the blank mold two-split mold section 18, is provided at the opposite side, with the plunger mechanism 1 held therebetween.

Figure 5:
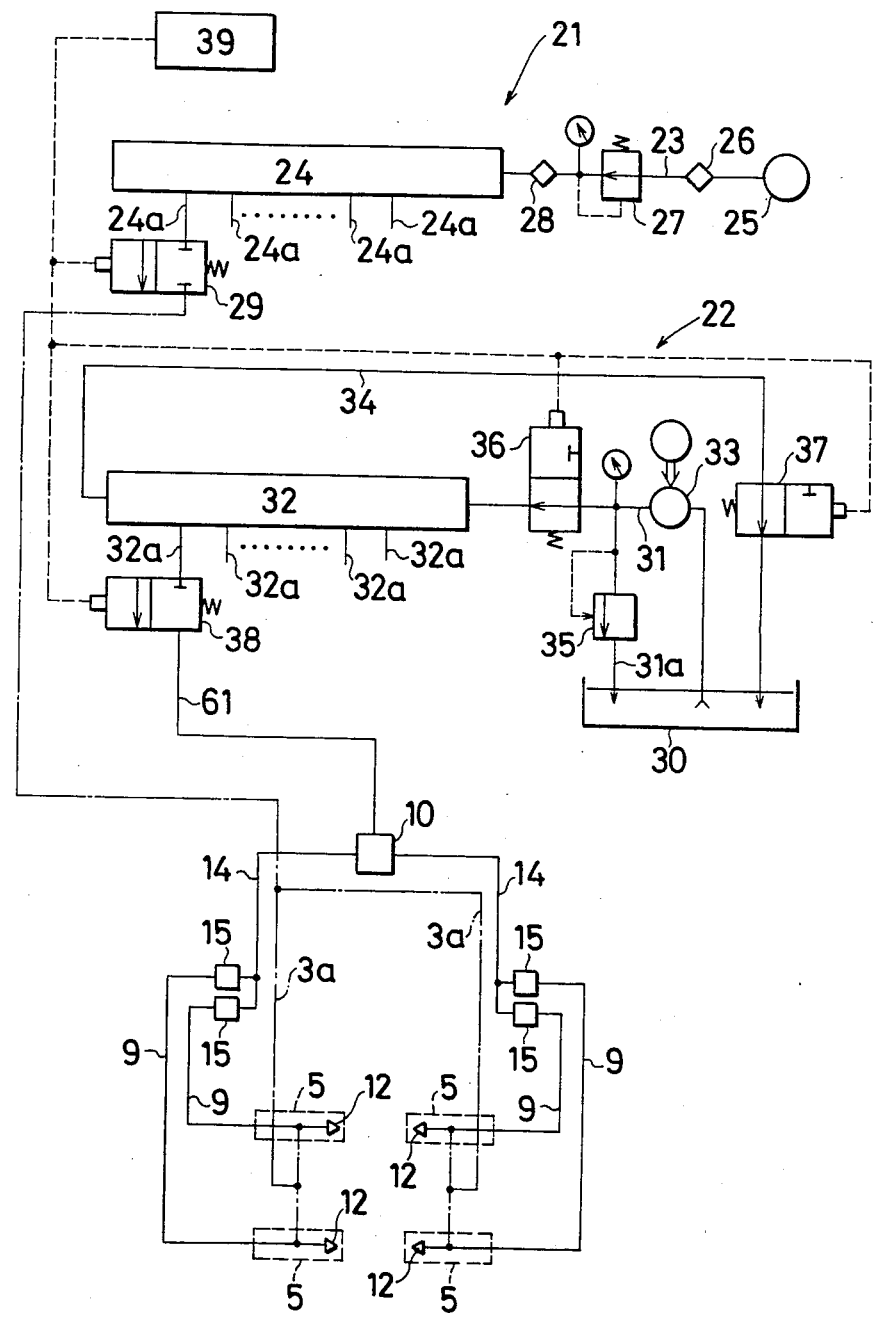
FIG. 5 is a flow diagram for an air feed system and an oil feed system for neck rings.
Figure 6:
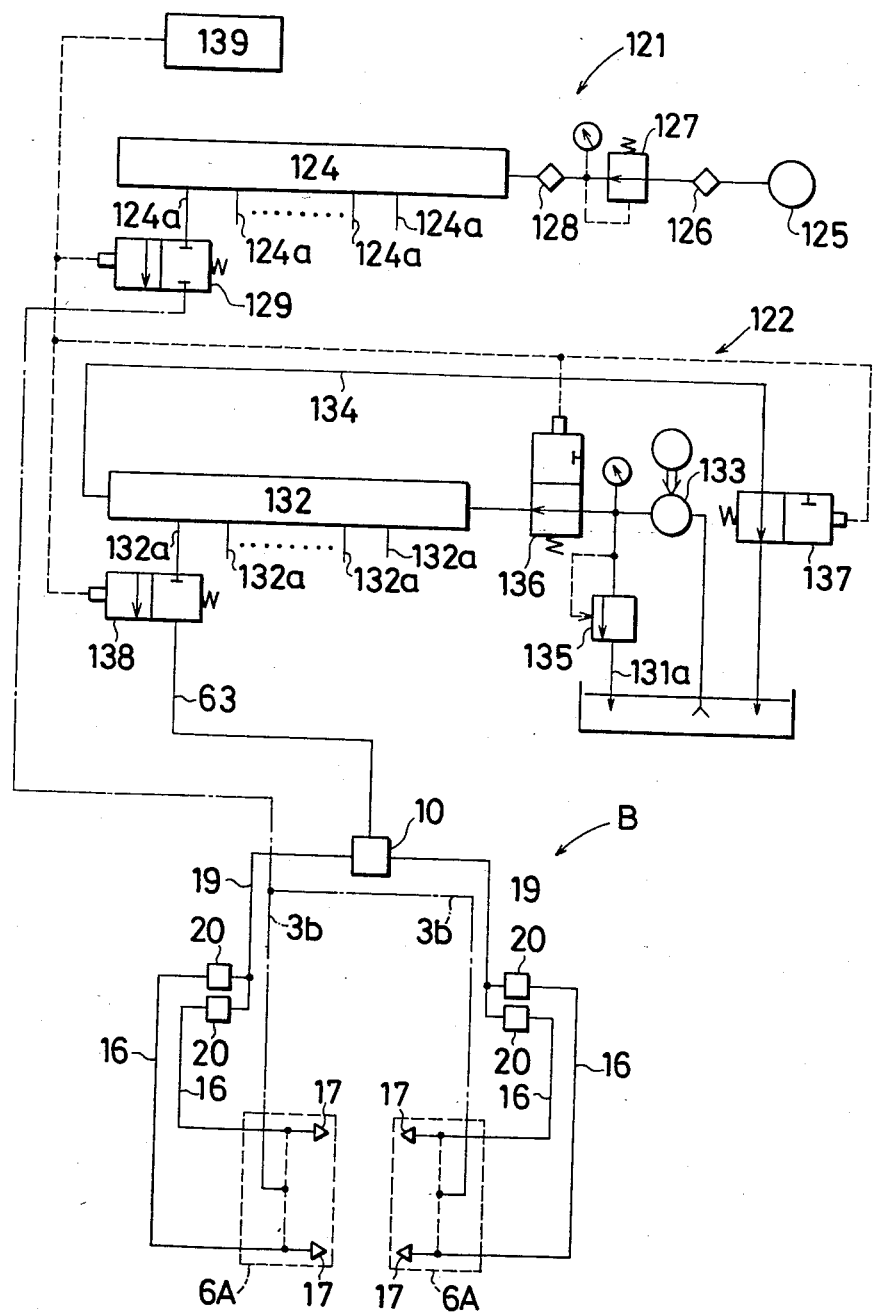
FIG. 6 is a flow diagram for an air feed system and an oil feed system for blank molds.

FIG. 5 shows the neck ring air feeding and oil feeding mechanisms in the form of a flow diagram, while FIG. 6 is a similar flow diagram for the blank molds.

Hereinbelow, description will be made with respect to FIG. 5 for the neck molds, in which numeral 21 represents the air feeding system, while numeral 22 denotes the oil feeding system.

In the air feeding system 21, there are provided a compressor 25 for supplying pressurized air into a branch pipe 24 through an air feeding passage 23, a filter 26 provided in the course of the air feeding passage 23, a pressure reducing valve 27, a lubricator 28, etc. Branched passages 24a of the branch pipe 24 are provided to respectively correspond to corresponding forming sections of the bottle making machine, and in the course thereof, a solenoid valve 29 is provided, while these branched passages 24a are communicated with the air feeding passage 3a of the support bracket 3 for the corresponding forming section.

On the other hand, in the oil feeding system 22, there are provided a pump 33 for supplying the lubricant in a tank 30 to a branch pipe 32 through an oil feeding passage 31, an oil returning passage 34 leading to the tank 30 from the end of the branch pipe 32, a valve 35 provided in the course of the oil feeding path 31 so as to detect that the inner pressure of the oil feeding passage 31 has exceeded a set value for opening a branch passage 31a, thereby to return the excessive lubricant in the oil feeding passage 31 back into the tank 30, a solenoid valve 36 for opening or closing the oil feeding passage 31, and a solenoid valve 37 for opening or closing the oil returning passage 34. The oil feeding passage 31, branch pipe 32 and oil returning passage 34 form a circulating path for circulating the lubricant at all times so that inconveniences such as undesirable settling of the lubricant, clogging, etc. may not take place. The respective branched passages 32a of the branch pipe 32 are provided also to correspond to the respective forming sections of the bottle making machine, while in the course thereof, solenoid valves 38 are provided, and the oil feeding passage 61 connected to the solenoid valve 38 is coupled with the junction block 10 of the corresponding forming section.

Figure 7:
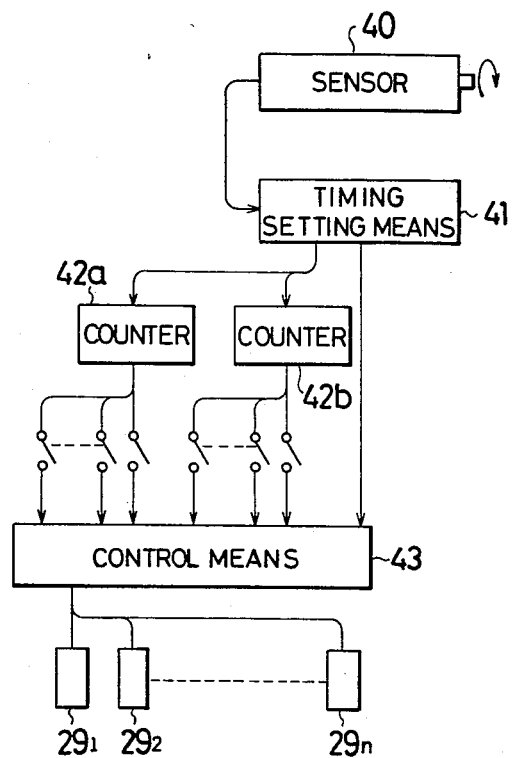
FIGS. 7 and 8 are block diagrams respectively showing an air feed system control circuit and an oil feed system control circuit.
Figure 8:
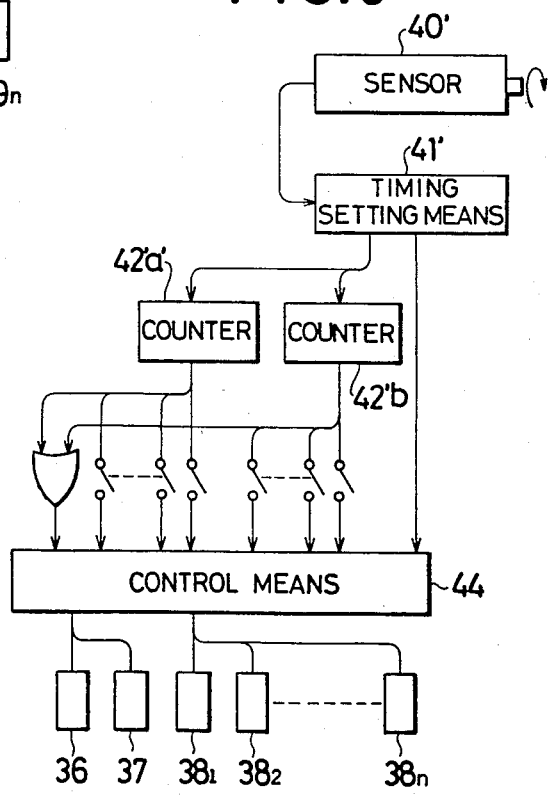

Thus, the open/close control of the respective solenoid valves 29, 36, 37 and 38 for the air feeding system 21 and the oil feeding system 22 is arranged to be effected by a control circuit 39 in FIG. 5. FIGS. 7 and 8 are block diagrams respectively showing outlines of the air feeding system and oil feeding system for the above control circuit 39.

In the air feeding system control circuit shown in FIG. 7, there is provided a sensor 40 which is arranged to function in synchronization with the functioning cycle of the respective forming sections of the bottle making machine for outputting a signal corresponding to one functioning cycle of each forming section. A timing setting means 41 for directly receiving the signal of the above sensor 40 is arranged to designate any desired section in one functioning cycle for each forming section, thereby to produce an on/off signal at such timing. There are also provided counters 42a and 42b which have the different set counts respectively, and so arranged as to receive the count signals corresponding to the respective forming sections and produced from said timing setting means 41 for counting thereof, and to clear the count upon arrival at a predetermined count value for sending out signals corresponding to a control means 43 at the subsequent stage. More specifically, when the number of the functioning cycles of the respective forming sections reaches the set counts of the counter 42a or 42b, the signal corresponding thereto is input to the control means 43. In the control means 43, the signal directly applied from the timing setting means 41 and the signal input through the counter 42a or 42b are logically processed to output a signal for subjecting the solenoid valve 29 in the corresponding forming section to the open/close control. The counters 42a and 42b are arranged to be desginated as desired according to the respective forming sections, whereby it is determined at each of which functioning cycle the open/close function of the solenoid valve 29 for the respective forming section is to be effected.

Meanwhile, in the oil feeding system control circuit shown in FIG. 8, the sensor 40', timing setting means 41', and counters 42'a and 42'b are commonly used for the air feeding system control circuit described earlier. In this circuit, besides effecting the open/close control of the solenoid valves 38 for the branched passages 32a of the branch pipe 32 corresponding to the respective forming sections by the output of a control means 44 which subjects to the logical processing, the timing signal of the timing setting means 41' and the output of the counter 42'a or 42'b, it is also arranged to effect the open/close control of the solenoid valves 36 and 37 which are used for pressurization and de-pressurization of the circulation passage for the oil feeding system 22. For the control of the solenoid valves 36 and 37, the circuit is so constructed that they can function, even when either one of said counter 42a or 42b counts up, whereby the open/close function of these solenoid valves 36 and 37 is carried out without fail, when any one of the other solenoid valves 38 corresponding to the forming sections is caused to function.

Figure 9:
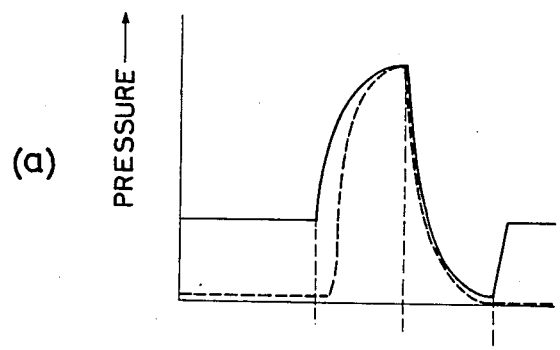
FIG. 9 is a diagram explanatory of a relation between functionings of magnet valves in the oil feeding system and oil pressure in the oil feeding passage.

FIGS. 9 (a), (b), (c) and (d) are diagrams showing the relation between the open/close functions of the pressurizing and de-pressurizing solenoid valves 36 and 37 and other solenoid valves 38 corresponding to the forming sections, and the oil pressure within the branch pipe 32 and oil pressure within the oil feeding passage after the solenoid valves 38 corresponding to the open/close functions.

Subsequently, the functioning of this apparatus will be described hereinbelow.

The solenoid valves 29 and 38 corresponding to the respective forming sections in the air feeding system 21 and the oil feeding system 22 are made of normally closed type valves which are closed normally. On the other hand, the pressurizing and de-pressurizing solenoid valves 36 and 37 for the oil feeding system 22 are made of normally open type valves which are held in the open state normally. When the bottle making machine starts functioning, at each one operating cycle of the respective forming sections, the sensor 40 feeds signals corresponding thereto, into the timing setting means 41. Upon receipt of the above signal, the timing setting means 41 feeds into the control panels 43 and 44, timing signals equivalent to the predetermined specific section in the one functioning cycle of the forming section. The setting of the section in the functioning cycle by the timing setting means 41 is arranged to be altered as desired even during driving of the bottle making machine.

In the case where, for example, the counter 42a is designated in advance with respect to a certain forming section, when the number of the functioning cycles of this forming section has reached the number of times equivalent to the set count of said counter 42a, a count-up signal is applied from the counter 42a to the control means 43. At the control means 43, this signal, and the timing signal corresponding to this forming section and separately fed from the timing setting means 41, are subjected to logical processing so as to open the air feeding solenoid valve 29 corresponding to this forming section.

Meanwhile, from the timing setting means 41, the timing signal corresponding to the above forming section is also fed to the oil feeding control means 44 in the similar manner, while the pressurizing and de-pressurizing timing signals are fed apart from the above. Similarly, a count-up signal is fed to the control means 44 also from the designated counter 42a. In the control means 44, these signals are subjected to logical processing to effect the open/close control of the pressurizing solenoid valve 37, de-pressurizing solenoid valve 36 and oil supplying solenoid valve 38 corresponding to this forming section.

The above open/close control will be explained with reference to FIG. 9. In the first place, the pressurizing solenoid valve 37 is closed as shown in FIG. 3, whereby the return port side of the circulating passage of the oil feeding system 22 is closed, and the oil pressure within the branch pipe 32 is sharply raised as shown by a solid line in FIG. 9(a). At a slight delay from the above, the oil feeding solenoid valve $38_1$ of the branched passages 32a of the branch pipe 32 is opened, and the pressure in the oil feeding passage after said solenoid valve $38_1$ starts to be rapidly raised as shown in a dotted line in FIG. 9(a). (In this embodiment, the pressure is raised up to 15 kg/cm$^2$). After a predetermined period of time, the pressurizing solenoid valve 37 is returned to the original open state, while the pressurizing solenoid valve 36 is closed, with the oil pressure of the branch pipe 32 being rapidly lowered. Following the above, the oil pressure in the oil feeding passage after the solenoid valve 38 is also rapidly reduced, each being lowered down to 0 level. Thereafter, when the oil feeding solenoid valve 38 is returned to the original closed state, the de-pressurizing solenoid valve 36 is also returned back to the original opened state through a slight delay, and subsequently, the original state in which the lubricant passes through the circulating passage is restored. (In this embodiment, the oil pressure reaches 5 kg/cm$^2$ at this time.)

By the control functions of the air feeding system 21 and the oil feeding system 22 as described above, the lubricant and pressurized air are fed into the respective through-holes 5a of the neck ring nozzle holders 5 of the above forming sections for being mixed, and are jetted out in the form of a mist from the neck ring nozzles 12 provided at the forward end of each holder 5. For the timing of this jetting or spraying, the adjustment at the timing setting means 41 of the control circuit 39 is effected so that the neck rings 13 are brought into the state where they are reverted onto the neck mold receiving seat 8 as shown in FIG. 3.

In this embodiment, since the two counters 42a and 42b having different set counts are provided as the counters for setting the spraying intervals of the lubricant solution, the spraying interval may be set as desired by selecting one of them for designation. Moreover, due to the fact that either one of the counter 42a or 42b may be selected as desired according to each forming section, it is possible to set the spraying frequency corresponding to each section, even when there is a deviation with respect to the parting property of the molds owing to the difference in external factors according to the respective forming sections. In the case where there is a deviation in the external factors, etc. for each cavity in one forming section, or where a pair of nozzles are provided for one mold as in this embodiment and the external factors differ according to these nozzles, it is possible to uniformly apply the lubricant solution to the molds corresponding to the respective nozzles by adjusting the respective constant amount feeding devices 15.

In the foregoing embodiment, although the arrangement in which the counters 42a and 42b are commonly used for the air feeding system 21 and the oil feeding system 22, is described, it may be so modified that different counters are employed for the air feeding system 21 and the oil feeding system 22 so as to effect the feeding of the lubricant solution by a designated cycle irrelevant to the feeding of the pressurized air. In this case, it is so adapted that the spraying of the lubricant solution is to be effected in the cycle designated for the supplying of the pressurized air.

With respect to the diagram of FIG. 6 for the blank molds also, the arrangement is exactly the same as for the neck rings, with the air feeding system being represented by numeral 121 and the oil feeding system by 122.

The air feeding system 121 includes a compressor 125 for supplying the pressurized air into the branch pipe 124 through an air feeding passage 123, a filter 126 provided in the course of the air feeding passage 123, a pressure reducing valve 127 and a lubricator 128, etc. Respective branched passages 124a of the branch pipe 124 are each provided to correspond to the respective forming sections of the bottle making machine. In the course of these passages 124a, solenoid valves 129 are respectively provided, with the branched passages 124a being communicated with the air feeding passage 3b of the support bracket 3 for the corresponding forming section.

On the other hand, the oil feeding system 122 includes a pump 133 for supplying a lubricant solution in a tank 130 into a branch pipe 132 through an oil feeding passage 131, an oil returning passage 134 leading to the tank 130 from the end of the branch pipe 132, a relief valve 135 provided in the course of the oil feeding passage 131 so as to detect that an internal pressure in the oil feeding passage 131 has exceeded a set value and to open the branched passage 131a for returning the excessive lubricant solution in the oil feeding passage 131 into the tank 130, a solenoid valve 136 for opening and closing the oil feeding passage 131, and a solenoid valve 137 for opening and closing the oil returning passage 134, with a circulating passage being formed by the oil feeding passage 131, branch pipe 132 and oil returning passage 134, whereby the lubricant solution is circulated at all times to avoid inconveniences such as settling of the lubricant solution, clogging, etc. Respective branched passages 132a of the above branch pipe 132 are also provided to correspond to the respective forming sections of the bottle making machine, with solenoid valves 138 being respectively provided in the course thereof, and the oil feeding passage 63 connected to the solenoid valves 138 are coupled to the junction box 10 of the corresponding forming section.

Thus, the open/close controls of the respective solenoid valves 129, 136, 137 and 138 for the above air feeding system 121 and the oil feeding system 122 are arranged to be effected by a control circuit 139.

The control circuit 139 has exactly the same construction as the control circuit 39 for the neck rings as shown in FIG. 5, but the adjustment at the timing setting means 41 of the control circuit 139 is so made that the timing for jetting out the mist of lubricant corresponds to the moment when the two half parts of blank mold 18 are fully opened to stop.

Since the functionings of the respective solenoid valves and control circuits are exactly the same as in the case of the neck rings, detailed description thereof is abbreviated for brevitiy.

Owing to the fact that the spray of the lubricant solution is directed upwardly from the nozzles 12 disposed below the neck rings 13, towards approximately the intermediate area of the mold surfaces with respect to the neck rings, there is no possibility that the spray of the lubricant solution is disturbed by the rising air current produced in a high temperature atmosphere around the plunger mechanism 1, and thus, the lubricant solution can be almost uniformly applied over the entire mold surfaces, while a very small amount of lubricant solution (0.01 c.c.–0.30 c.c per nozzle) may be sufficient for the purpose, since no wasteful scattering of the lubricant solution takes place. This also contributes to an improvement of the yield rate of products, since there is no possibility that the products formed immediately after the application of the lubricant solution become faulty due to soiling by the lubricant solution. Particularly, even in the case of the double gob or triple gob system as in the present embodiment, the distance between the neck rings 13 and the nozzles 12 at the respective cavities may be made equal to each other, with a simultaneous reduction (about 50 mm) of such distance, and therefore, it is more advantageous to reduce the lubricant solution to a still smaller amount. Moreover, since the spray is directed from the lower side, such an inconvenience that the plunger is soiled by the lubricant solution to invite defects in the final products, may be advantageously avoided.

Furthermore, owing to the fact that the neck ring nozzle holders 5 are mounted on the upper portion of the plunger mechanism 1 through the support bracket 3, even when neck rings of different kinds are employed, they follow the vertical movements of the plunger mechanism 1 as in the same unit, without any alteration of the mutual positional relation, and accordingly, the positional relation between the neck ring nozzles 12 and the neck rings 13 corresponding thereto may be maintained constant at all times, and thus, from this point also, the uniform application of the lubricant solution and the reduction of the amount of application thereof to a very small amount can be accelerated.

In the spraying of the lubricant solution with respect to the blank molds also, the situation is generally the same as in the case of the neck rings 13, and the uniform application may be achieved by the very small amount of the lubricant solution.

Figure 2:
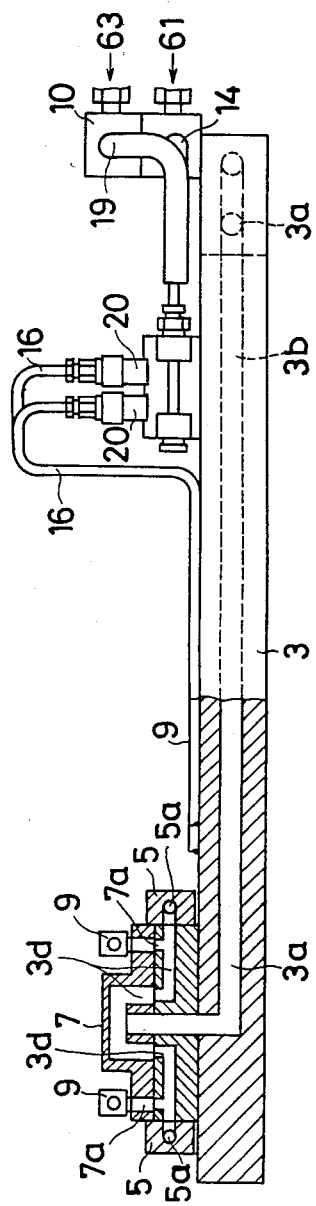
FIG. 2 is a fragmentary side sectional view showing an essential portion of the arrangement of FIG. 1.

Since the neck ring nozzle holders 5 are pivotally supported for raising or lowering with respect to the air feeding block 7, they can be retreated from the position of the neck ring receiving seat 8 by raising these holders 5 as shown in the imaginary lines in FIG. 2 during replacement of the plunger and thimble, thus never obstructing the replacement work thereof.

With respect to the blank mold nozzle holders 6 also, these holders 6 do not obstruct the replacement of the blank molds, since they are disposed at the lower portion of the blank molds, and in the similar manner as in the case of the neck rings, the mutual positional relation does not vary, even when the neck rings are changed into neck rings of different kinds.

Although the application of the lubricant solution is effective for the improvement of the parting property of the molds, it also becomes a factor for reducing life of the molds on the other hand, and therefore, the interval for the above spraying should preferably be as long as possible. From the viewpoint as referred to above, it is effective to apply coatings, for example, of carbon, nickel plating, carbon fluoride plating, etc. onto the mold surfaces of the neck rings, blank molds, bottom plates and the like as steps for prolongation of the spraying interval.

In the present embodiment, when the carbon coating is not applied to the mold surfaces of the blank molds, in order to avoid formation of defects on the finished articles, the spraying interval at the early stage had to be lowered to less than 40 in the count value of the counter, while in the case when the carbon coating is applied to the mold surfaces, it was possible to make the interval at 60 in the count value of the counter. As is seen form the above result, in the case where the carbon coating is applied, the life of the blank molds becomes longer by about 30%, as compared with the case where such coating is not applied.

Figure 10:
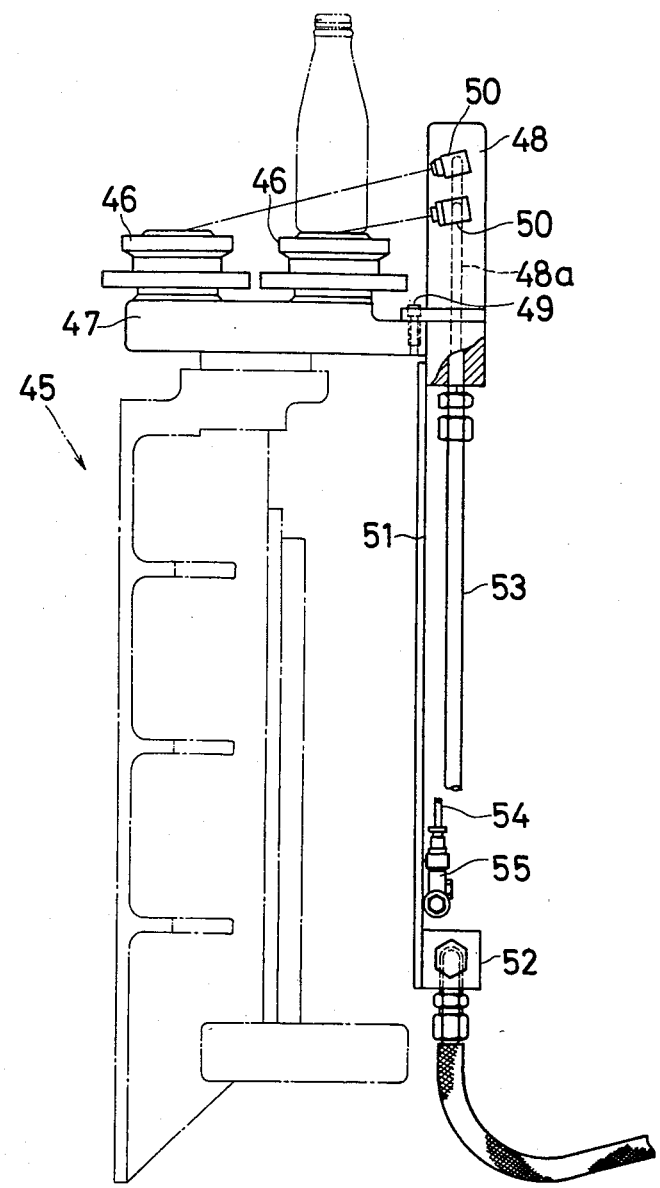
FIG. 10 is a side elevational view showing the lubricating apparatus for the bottom plate in a blowing process.

FIG. 10 shows one example of an apparatus for applying the lubricant solution onto the bottom plate for the blowing process in the bottle making machine, as constructed through employment of the systems similar to the air feeding system 21 and oil feeding system 22 in the foregoing embodiments.

In FIG. 10, there is provided a bottom mold mechanism 45, on the upper portion of which, a bottom plate adaptor 47 for supporting the bottom plate 46 is provided. The bottom mold mechanism 45 as referred to above is a mechanism of a double gob system, with two bottom plates 46 being arranged for the bottom plate adaptor 47. To this bottom plate adaptor 47, a bottom plate nozzle holder 48 is fixed through tightening by bolts 49.

In the nozzle holder 48, bottom plate nozzles 50 respectively corresponding to said bottom plates 46 are provided so as to be set in such a manner that the spraying direction thereof is so directed as to blow down toward the mold faces of the respective bottom plates 46 from the slantwise upper direction as shown in FIG. 10.

There is also provided a mounting plate 51 connected to the bottom mold nozzle holder 48, and an air feeding pipe 53 is coupled with a through-hole 48a formed in the bottom mold nozzle holder 48 through a piping block 52 secured to said plate 51. This through-hole 48a is branched in the holder 48 so as to be connected with the respective nozzles 50. Thus, the air feeding passage extended from said piping block 52 is connected, through solenoid valves to the branched passage to which the branch pipe (equivalent to numeral 24 in FIG. 5) corresponds in the similar manner as in the air feeding system described earlier.

On the other hand, the nozzles 50 are respectively connected to the oil feeding pipes 54, which are connected, through solenoid valves, to the branch passage to which the branch pipe (equivalent to numeral 32 in FIG. 5) thereof corresponds, through the constant amount feeding device 55 provided on said plate 51 in the similar manner as in the oil feeding system described earlier.

In the case where the lubricant solution is applied to the bottom plates 46, although conditions are different with respect to the spraying distance and spraying angle between the nozzle 50 corresponding to the bottom plate 46 at the side close to the nozzle holder 48 and the nozzle 50 corresponding to the bottom mold 46 at the side remote from the nozzle holder 48, uniform application of the lubricant solution onto the respective bottom plates 46 may be effected by taking a balance of the lubricant solution through respective adjustment of the constant amount feeding devices corresponding to the nozzles 50. (For example, 0.08 c.c./one time for the bottom mold 46 close to the holder 48, and 0.2 c.c./one time for the bottom mold 46 remote from the holder 48.)

Although the applicating mechanism shown in FIG. 10 as described so far is in the state where it is provided one by one to the respective bottom plates 46, in the actual arrangement, two nozzles 50 are provided to corespond to each other for one bottom plate 46, so that the feeding amount of the lubricant solution may be adjusted for each nozzle. Besides the above construction, it may be so arranged that more than three nozzles correspond to one bottom plate 46.

The timing for spraying the lubricant solution for bottom plate is controlled by the piping passages and control circuits having constructions similar to those shown in FIGS. 5, 7 and 8, and is so set that the spraying is effected at the moment when the final articles formed by the blow molds are taken out.

In the above example also, in the similar manner as in the application of the lubricant solution for the neck rings and blank mold as described earlier, even when the height of the bottom plate mechanism has been altered due to the change of the articles to be dealt with, there is no variation in the positional relation between the bottom molds 46 and the nozzles 50, since the nozzles 50 are vertically moved in one unit with the bottom plate mechanism 45, thus making it possile to apply a constant amount of lubricant solution at all times.

Moreover, since the nozzle holder 48 may be provided so as to be slightly spaced from the mounting position of the bottom molds 46, it becomes no obstruction for the replacement of the bottom plates 45.

It should be noted here that in the foregoing embodiment, although the independent piping system and control system are respectively employed for the apparatuses for the neck rings, blank molds and bottom plates, the present invention is not limited in its application to the above embodiment alone, but the arrangement may be so modified that piping system and control system for common use are adopted depending on necessity.

What is claimed is:

1. A mold lubricating apparatus for a glassware forming machine having a mold table, a split blank mold assembly above the table for moving blank mold halves between open position and closed molding position, means for supporting a neck ring above the table under the mold halves when in closed position, lubricating nozzles supported on the table for spraying a lubricant solution upwardly into a neck ring supported under the closed mold halves, a lubricant solution feeding means for feeding the lubricant solution to said nozzles, an air feeding means for feeding compressed air to said nozzles, and control means respectively for controlling feeding functions of said lubricant solution feeding means and said air feeding means.

2. A mold lubricating apparatus as claimed in claim 1 which further comprises nozzle holder provided on a bottom plate mechanism, nozzles mounted on said nozzle holder so as to spray a mixed mist of a lubricant solution and air toward the mold faces of the bottom plate on said bottom plate mechanism, a lubricant solution feeding means for feeding the lubricant solution to said nozzles, an air feeding means for feeding compressed air to said nozzles, and control means for controlling feeding functions of said lubricant solution feeding means and said air feeding means.

3. A mold lubricating apparatus as claimed in claim 1, wherein the nozzles are carried on pivotal nozzle holders disposed about an opening in the table for a plunger assembly, the nozzle holders being adapted to pivot upwardly and outwardly with respect to the opening to avoid obstructing the plunger assembly when raised through the opening.

4. A mold lubricating apparatus as claimed in claim 1, including further lubricating nozzles disposed on the table for spraying lubricant solution upwardly into the respective mold halves in the open position.

* * * * *